United States Patent [19]

Johnston

[11] Patent Number: 5,014,833

[45] Date of Patent: May 14, 1991

[54] ROLLER CLUTCH WITH IMPROVED INSTALLATION

[75] Inventor: Albert D. Johnston, Huron, Ohio

[73] Assignee: General Motors Corporation, Detroit, Mich.

[21] Appl. No.: 543,502

[22] Filed: Jun. 25, 1990

[51] Int. Cl.$^5$ ............................................. F16P 3/34
[52] U.S. Cl. ................................... 192/45; 192/41 R
[58] Field of Search ............... 192/45, 45.1, 41 A, 192/41 R

[56] References Cited

U.S. PATENT DOCUMENTS

| | | | |
|---|---|---|---|
| 3,087,590 | 4/1963 | Gorsky | 192/45 |
| 3,732,956 | 5/1973 | Johnson et al. | 192/45 |
| 4,185,724 | 1/1980 | Kitchin | 192/45 |
| 4,712,661 | 12/1987 | Lederman et al. | 192/45 |
| 4,821,857 | 4/1989 | Groh | 192/45 |
| 4,874,069 | 10/1989 | Lederman | 192/45 |
| 4,924,980 | 5/1990 | Lederman | 192/41 R |

FOREIGN PATENT DOCUMENTS

| | | | |
|---|---|---|---|
| 2330193 | 1/1975 | Fed. Rep. of Germany | 192/45 |
| 745437 | 5/1933 | France | 192/45 |
| 106045 | 12/1942 | Sweden | 192/45 |

Primary Examiner—Allan D. Herrmann
Assistant Examiner—Nicholas Whitelaw
Attorney, Agent, or Firm—Patrick M. Griffin

[57] ABSTRACT

An improved twist lock installed roller clutch cage uses axially central ribs on the bottom of the journal blocks that move into matching grooves in the bearing surfaces of the cam race when the cage is twisted into place. This retains the cage axially to the cam race, but leaves the end faces of the cam race totally unobstructed.

3 Claims, 2 Drawing Sheets

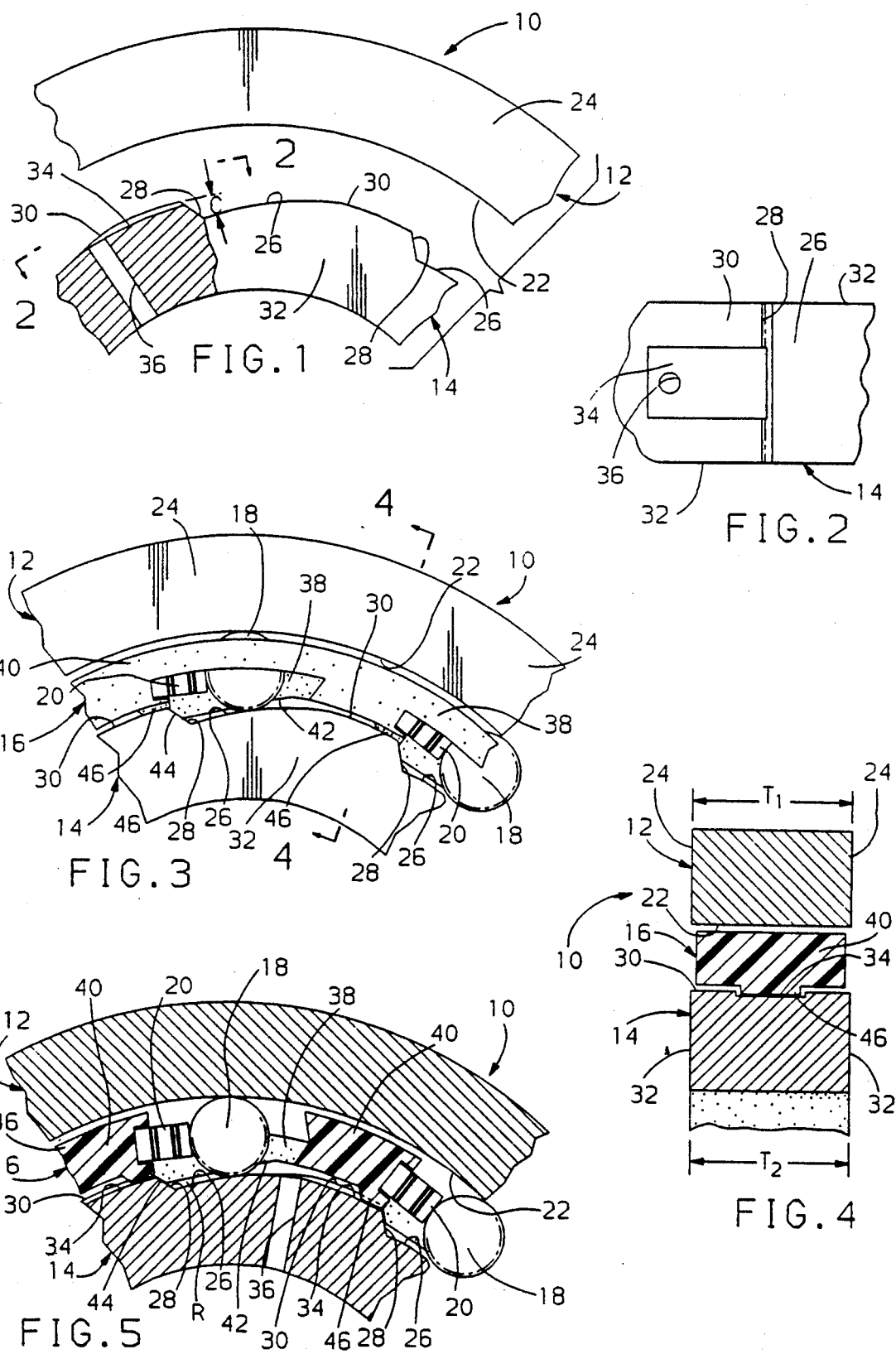

ROLLER CLUTCH WITH IMPROVED INSTALLATION

This invention relates to overrunning roller clutches in general, and specifically to such a clutch assembly with a novel means for axially retaining the cage to the cam race.

BACKGROUND OF THE INVENTION

Overrunning roller clutches provide for selective relative rotation between a pair of coaxial clutch races through the use of spring energized rollers that jam between the races in one direction, but free wheel in the other. Each of the races is generally annular or ring shaped, and each has a pair of flat end faces that determine its axial thickness. Each race may shift axially back and forth to an extent as the clutch operates, however, especially if the clutch is used in a vehicle transmission environment where there are large, rapidly shifting axial forces caused by actuating pistons and the like. In such an environment, the race end faces may be abutted with, or very close to, other structures, and may see significant axial thrust loads therefrom.

Besides the flat end faces, the clutch races have inner surfaces that confront one another across an annular space. One race, the pathway race, has an inner surface that is simply a smooth cylindrical pathway. The other race, the cam race has an inner surface that is more complex. The cam race surface is made up of a plurality of cam ramps that slope in one direction down to a cam hook, which slopes up much more sharply in the other direction. Each cam ramp-cam hook pair, which forms an asymmetrical V when viewed along the clutch axis, is separated by a partially cylindrical bearing surface. The races serve to keep the rollers in their proper radial and circumferential location, because the rollers are in continual contact with the cam ramps and pathway, both during lockup and overrun. During lockup, the rollers are jammed between the cam ramps and pathway, and cannot move significantly in any direction. During overrun, the energizing springs push the rollers into contact against the cam ramps and pathway, ready to lockup again. The axial position of the rollers, however, must be maintained by another clutch component, known as the cage.

The cage, which is installed to the cam race radially between the races, provides two basic functions, which determine its shape. First, it retains the rollers and springs, both before installation and during clutch operation, for which it has a series of generally rectangular pockets that sit over the cam ramps. Second, it maintains the races coaxial to one another during clutch operation, for which it has a plurality of close fitting journal blocks that sit over the bearing surfaces. Techniques exist for molding the pockets and journal blocks together as a unitary cage with only two, axially parting dies. This method is generally known as bypass molding, and is very cost effective. It is highly desirable, therefore, that the shape of any structure molded with the cage be amenable to bypass molding.

Another consideration that has driven the shape of the cage is the necessity keeping the cage properly positioned and aligned between the races during clutch operation. The radial position of the cage, like the rollers, is basically fixed, since its journal blocks are closely confined between the races. However, during overrun, the pathway rides over the journal blocks are closely confined between the races. However, during overrun, the pathway rides over the journal blocks, creating friction that could tend to rotate the cage out of its proper circumferential position relative to the cam race. To prevent that, the cage is molded with a series of reaction faces that abut the cam hooks and stop the cage from being rotated out of position. During lockup, the energizing springs push off of the jammed rollers and against the cage pockets to push the reaction faces against the cam hooks. To maintain the axial position of the cage, and by implication of the rollers, the cage is typically molded with reaction ears at the edge of the cage that are intended to abut the end faces of one of the races, usually the cam race. The cage is thereby prevented from shifting axially significantly. The reaction ears can be made bypass moldable if they are alternated around the two axial sides of the cage, so as to have no mutual circumferential overlap.

Cage shape and size is also determined by the need for easy cage installation. The reaction ears are deliberately made short, in the radial sense, at least on the lead axial side of the cage, that is, the side of the cage that is pushed axially over the cam race first when the cage is installed. By doing so, the cage can initially be turned in one direction to a position relative to the cam race where the reaction ears on the lead side of the cage are aligned with the notch of the V's. This gives enough clearance for the reaction ears to pass through the notch as the cage is pushed over the cam race. Then, the cage is rotated in the other direction until the reaction faces abut the cam hooks and the reaction ears simultaneously move over the end faces of the cam race. This cage installation method has been termed "twist lock." Finally, the pathway race is pushed over the rollers and rotated in the same direction that the cage was twisted.

There are limits to how much resistance to axial cage shifting reaction ears of such a design can provide. As noted, the reaction ears on the lead side of the cage must be fairly short to allow them to pass through. Also, they must alternate around the two sides of the cage if they are to be bypass moldable, which limits their number on each side to half the total number of cam ramps. While the reaction ears on the trailing side of the cage can be made larger, those on both sides of the cage necessarily overlay the end faces of the cam race. Any adjacent components that are thrust toward the cam race end faces may, therefore, collide with the reaction ears.

SUMMARY OF THE INVENTION

The invention provides a roller clutch with a moldable, one piece cage that can be installed to the cam race by a pass through and twist technique, but which is axially retained to the cam race by a new means that avoids the drawbacks noted above.

The preferred embodiment of the overrunning clutch assembly disclosed incorporates a pair of clutch races, each of which has a pair of flat end faces that are substantially coplanar, and which define the axial thickness of the races. The outer race is conventional pathway race, and the inner race is a cam race that has conventional cam ramps and cam hooks. The partially cylindrical bearing surfaces separating the cam ramp-cam hook pairs have an additional feature, however. A circumferentially extending installation groove is cut into each bearing surface, which is axially located about midway in the bearing surface, inboard from both of the end faces of the cam race. In addition, in the particular embodiment disclosed, an oil hole is drilled radially through the cam race into at least some of the installation grooves.

The cage that is to be installed between the clutch races has a plurality of generally rectangular roller pockets, each of which is the proper size to retain a roller and spring over a cam ramp. Each pocket is also molded with a reaction face adapted to abut a respective cam hook. The pockets are separated by a plurality of partially annular journal blocks, each of which is the proper size to fit over a cam race bearing surface with a close radial clearance from the bearing surface and the pathway, thereby maintaining the races substantially coaxial. Integrally molded to the inner surface of each journal block is a locking rib. Each locking rib is located approximately in the center of the journal block, and is sized so as to fit closely, but not tightly, within an installation groove. The length of each locking rib is predetermined to be just less than a so called index factor. The index factor is the degree to which the cage may be circumferentially misaligned relative to the cam race in one direction and still be pushed freely over the cam race. The index factor defines a pre-installation cage position, in effect.

Therefore, when the cage is set to its pre-installation position and pushed over the cam race, the locking ribs will pass through without interference as well. When the cage reaches its proper axial position, twisting the cage in the opposite direction by the index factor moves the locking ribs into the installation grooves, and abuts the reaction faces with the cam hooks. In operation, the cage is thereby prevented from shifting in either axial direction relative to the cam race, but the end faces of the cam race are entirely unobstructed by any part of the cage. In addition, the installation grooves also provide a central lubrication trough for the clutch assembly.

It is, therefore, a general object of the invention to provide a roller clutch cage which can be axially locked to a cam race by a pushing and twisting method, but without obstructing the end faces of the cam race.

It is another object of the invention to provide such a cage through cooperating installation grooves cut into the cam race bearing surfaces, inboard of the cam race end faces, and locking ribs molded to the cage journal blocks that fit into the installation grooves when the cage is installed.

It is another object of the invention to use the installation grooves as a lubricant distribution network as the clutch operates.

DESCRIPTION OF THE PREFERRED EMBODIMENT

These and other objects and features of the invention will appear from the following written description, and from the drawings, in which:

FIG. 1 is a view of part of the races in coaxial relation before installation of the cage, with part of the cam race broken away to better illustrate an installation groove;

FIG. 2 is a view of part of a cam race bearing surface and installation groove taken along the plane 2—2;

FIG. 3 is a view of part of the clutch assembly of the fully assembled;

FIG. 4 is a cross sectional view taken along the line 4—4 of FIG. 3;

FIG. 5 is cross sectional view of FIG. 3 taken along the central plane of the clutch assembly;

Figure 6:
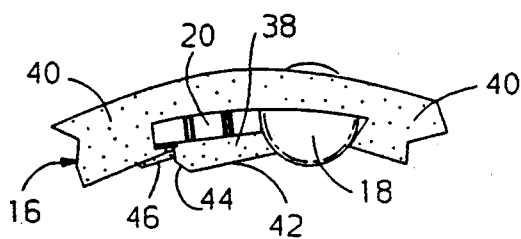
FIG. 6 is a view of one pocket and part of a journal block of the cage, with roller and spring, before installation of the cage.
Figure 7:
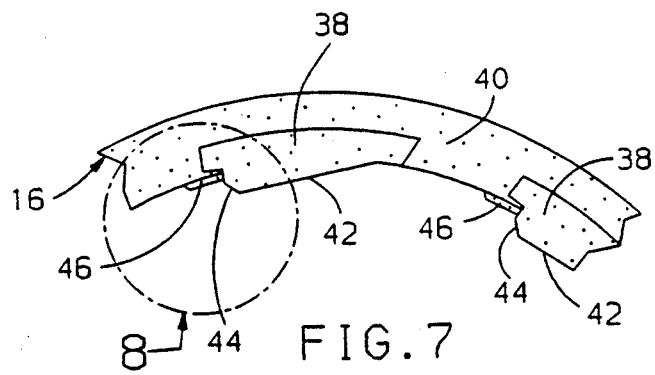
FIG. 7 is a view similar to FIG. 6, but of the cage alone.
Figure 8:
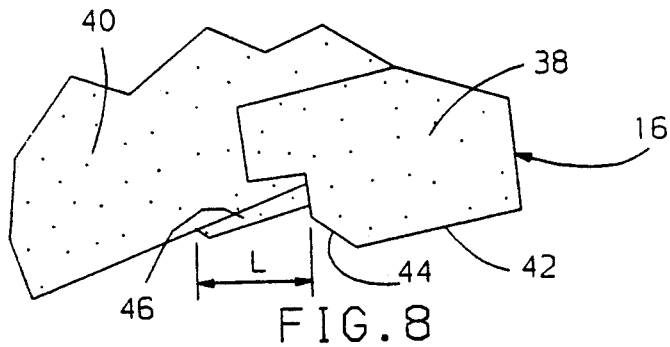
FIG. 8 is an enlargement of the circled portion of FIG. 7.
Figure 10:
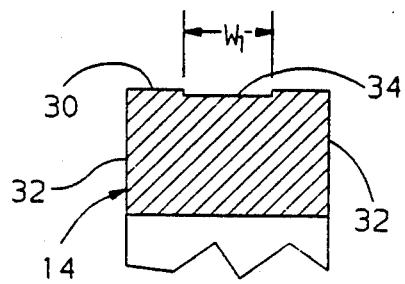
FIG. 10 shows just the cam race from FIG. 4.
Figure 9:
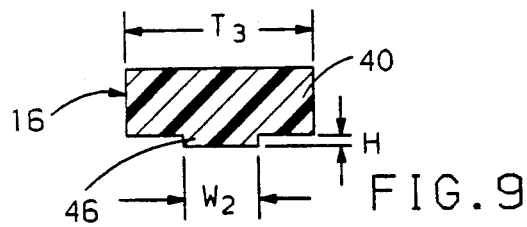
FIG. 9 shows just the cage from FIG. 4.

Referring next to FIGS. 1, 3, and 4, a preferred embodiment of the overrunning clutch assembly of the invention is indicated generally at 10. Clutch assembly 10 includes a conventional outer pathway race, indicated generally at 12, an inner cam race, indicated generally at 14, a molded plastic cage, indicated generally at 16, and a plurality of conventional rollers 18 and springs 20 retained in cage 16. Pathway race 12 is simply an annular steel ring with a cylindrical inner surface that provides a pathway 22. The central axis of pathway 22, while not visible on the page, constitutes the basic directional reference frame for assembly 10. Pathway race 12 is machined with a pair of flat, parallel end faces 24, which are perpendicular to its central axis, and which define its axial thickness $T_1$. Cam race 14, also basically a steel ring, includes several conventional features machined into its inner surface, including a plurality of cam ramps 26 and cam hooks 28. The cam ramps 26 slope at a shallow angle in one direction, while the much shorter cam hooks 28 slope sharply in the other direction. The cam hooks 28 serve as the transition to an equal plurality of partially cylindrical bearing surfaces 30 that separate the cam ramps 26. Like pathway race 12, cam race 14 has a pair of parallel flat end faces 32 that define its axial thickness $T_2$. As disclosed, $T_1$ and $T_2$ are the same, so that the end faces 24 and 32 are coplanar in the completed clutch assembly 10.

Referring next to FIGS. 1, 2 and 5, the pairs of respective cam ramps 26 and cam hooks 28 present a series of highly asymmetrical V shapes when viewed axially. The base of the V's has a clearance C relative to the diameter of the bearing surfaces 30. In a conventional clutch, the bearing surfaces 30 would be uninterrupted. Here, however, each bearing surface 30 has an axially centrally located, circumferentially extending installation groove 34 cut into it. Each installation groove 34 covers the entire length of the bearing surface 30, and therefore opens to a cam ramp 26 at one groove end, and to a cam hook 28 at the other, that is, into the clearance C. Each installation groove 34 has a constant axial width $W_1$, and a radial depth less than C. In addition, in the embodiment disclosed, an oil hole 36 is drilled radially through cam race 14, opening into several installation grooves 34. The installation grooves 34 remove some of the area of cam race bearing surfaces 30, but leave enough area for cage 16 to load against. The grooves 34 cooperate with additional structure on cage 16 to allow it to be easily installed, as is described below.

Referring next to FIGS. 5-9, cage 16, which is integrally bypass molded of a suitable plastic, has two basic and conventional structural features, including a series of pockets 38, one for each cam ramp 26, separated by a series of journal blocks 40, one for each bearing surface 30. Each pocket 38, which is generally rectangular in outline, serves to retain a roller 18 and spring 20. The radially inner edge 42 of one side of each pocket 38 is shaped so as to run parallel to a respective cam ramp 26, when cage 16 is installed, with a radial clearance R, as best seen in FIG. 5. In addition, edge 42 turns up sharply to form a reaction face 44 that matches the shape of cam hook 28. Each journal block 40 has an axial thickness $T_3$ slightly less than $T_1$ and $T_2$, and a radial thickness that is close to, just slightly less than, the radial separation that exists between the pathway 22 and bearing surfaces 30 when the races 12 and 14 are coaxial. As such, in the FIG. 5 installed position of cage 16, when the journal blocks 40 sit radially between the confronting race surfaces 22 and 30, circumferentially aligned with the bearing surfaces 30, they will maintain the races 12 and 14 substantially coaxial. The amount of radial clearance from journal blocks 40 is exaggerated in FIG. 5 for purposes of illustration. Integrally molded to the inner surface of each journal block 40 is a locking rib 46. Each locking rib 46 is axially centrally located, with an axial width $W_2$ that is slightly less than $W_1$, a radial height H approximately equal to the depth of installation groove 34, but less than the clearance C, and a circumferential length L that is defined below. In effect, locking rib 46 begins where reaction face 44 stops, as viewed from the axial perspective of FIG. 8, although rib 46 is not integrally molded to edge 42 or to reaction face 44. Those skilled in the art will recognize the shape of rib 46 as being amenable to bypass molding along with the rest of cage 16.

Figure 11:
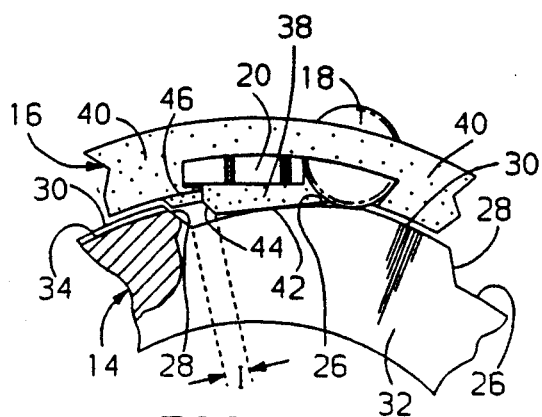
FIG. 11 shows the cage after it has been pushed over the cam race, still misaligned relative to the cam race.

Referring next to FIGS. 5 and 11, it may be seen how the length of locking rib 46 is related to cage 16. In FIG. 11, cage 16 is circumferentially misaligned relative to cam race 14 as compared to its FIG. 5 circumferentially aligned position. The misalignment is indicated at I, and could be expressed in absolute terms as a distance, or in relative terms as a number of degrees. More specifically, cage 16 is turned clockwise away from its installed position to the greatest degree that the radial clearance R defined above will allow while still permitting pocket edge 42 to pass over cam ramp 26. This distance can be called the cage index factor, that is, the degree to which any cage like 16 may be "indexed" in one direction and still clear the cam race 14. The index factor defines a pre-installation position of cage 16, which will vary with R. R, for the cage design disclosed, will also vary, depending on how large an area is desired for the reaction face 44. That is, the greater R is, the smaller reaction face 44 is. Here, the index factor is in the range of perhaps five degrees. The locking rib length L is deliberately made just less than I, for a reason described next.

Figure 12:
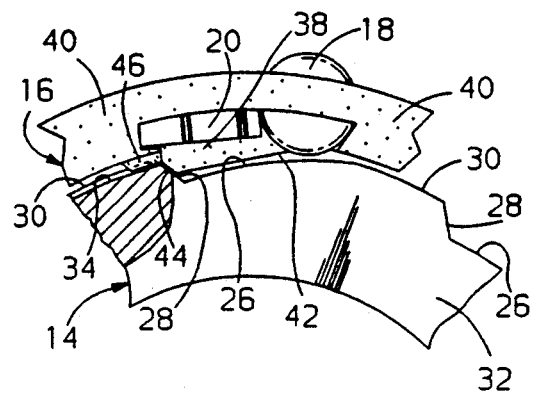
FIG. 12 shows the cage fully installed to the cam race, before the addition of the pathway race to complete the clutch assembly.

Referring next to FIGS. 11 and 12, it may be seen how the relative locations and dimensions of locking ribs 46 and installation grooves 34 allow cage 16 to be installed. In the FIG. 11 indexed position, locking rib 46 registers over the cam hook 28 and cam ramp 26, but does not circumferentially overlap the end face 32. This is so because locking rib 46, located contiguous to the cage reaction face 44, is deliberately made shorter than I, and reaction face 44 is turned away from cam hook 28 by the amount I. Because H is less than C, locking rib 46 can pass through the clearance C, missing any part of cam race 14, allowing cage 16 to be pushed axially over cam race 14 without interference. When cage 16 has been pushed over cam race 14 to its final axial position, locking rib 46 will be axially aligned with installation groove 34, since they are both centrally located. Cage 16 may then be turned back counterclockwise by the index factor. Each locking rib 46 will move freely into a respective installation groove 34, given their relative dimensions described above, simultaneously with the reaction faces 44 moving into abutment with the cam hooks 28, as shown in FIG. 12.

Referring again to FIG. 5, pathway race 12 is assembled over rollers 18 by the familiar and conventional "ringing in" technique to complete clutch assembly 10. In operation, cage 16 will have a good deal of resistance to shifting axially from its FIG. 4 position. There is a total resistance area A resisting axial shifting of cage 16 in either direction equal $L \times H \times N$, where N is the number of journal blocks 40. That area should be at least equal to the amount of area provided by the conventional cage reaction ears described above. This is so because there are N number of $L \times H$ size areas resisting axial shifting, not one half N, and because H can be larger than it could if rib 46 were molded integrally to edge 42. More important to the final assembly 10, no part of the locking ribs 46 overlays the cam race end faces 32, which remain unobstructed. Any adjacent structure that would tend to bump axially into cam race end faces 32 would not hit the locking ribs 46. Cage 16 is further protected by the fact that it is axially thinner than both races 12 and 14, and thus shielded by being slightly axially inboard of the coplanar race end faces 24 and 32. The fact that cage 16 is so protected would also decrease the resistance area A that would be needed to prevent cage 16 from shifting axially relative to cam race 14, so the advantage is self reinforcing. The circumferential position of cage 16 would be maintained by the reaction faces 44, as described in the background section above. Another operational advantage, for the embodiment disclosed, is the cooperation of oil holes 36 with installation grooves 34. In some applications, there is a need for lubricant for the rollers 18, and at the rubbing interface between the outer surface of journal blocks 40 and the pathway 22. Oil is initially forced radially outwardly through oil holes 36, where it spills into installation grooves 34. While the end of each groove 34 near the spring 20 is blocked by rib 46, the other end, which opens near roller 18, is not. Oil is thereby presented to roller 18, and from there will be transferred to pathway 22. Thus, the oil holes 36 can be drilled through the bearing surfaces 30, rather than through the cam ramps 26, as they often are in conventional designs. The cam ramps 26 are left uninterrupted.

Variations of the embodiment disclosed could be made. In some applications, as few as one or two locking ribs like 46 might provide enough resistance to axial shifting, especially if they could be made larger in area. Locking ribs could be made larger than those shown, since the only limitation on H is the available clearance C. To make H greater, of course, the groove 34 would have to be cut deeper, but that would not likely remove enough metal to seriously weaken the cam race 14. In some environments where a clutch assembly like 10 was to be used, it might not be possible to make $T_1$ as great as $T_2$, in which case cage 16 would not be as well shielded as it is in the embodiment disclosed. Still, since $T_2$ is greater that $T_3$, and since the locking ribs 46 do not overlay the cam race end faces 32, cage 16 would be well protected. In an application where the lubrication feature was not needed, the oil holes 36 could be eliminated, and the grooves 34 would not have to cover the whole length of bearing surface 30. The only absolute necessity is that the grooves 34 be long enough to accommodate the length of rib 46. In some roller clutch designs, there is not an adequate cam hook surface like 28 to use as a stop surface to abut a cage reaction face like 44. For example, a spring retention hole may be drilled into the cam hook 28. In such a case, the length of groove 34 could be made just equal to L, so that the lead end of rib 46 would abut the closed end of the installation groove 24 as cage 16 was turned back from its indexed position. In that case, the lead ends of the locking ribs 46 could provide the same stop function that the reaction faces 44 do. Therefore, it will be understood that it is not intended to limit the invention to just the embodiment disclosed.

The embodiments of the invention in which an exclusive property or privilege is claimed are defined as follows:

1. An overrunning roller clutch assembly comprising,
a generally annular pathway race having a cylindrical pathway,
a generally annular cam race having a pair of axially opposed end faces and a surface disposed generally coaxial to said pathway and comprised of a circumferentially spaced plurality of cam ramps separated by a plurality of partially cylindrical bearing surfaces, at least one of said bearing surfaces also having a circumferentially extending installation groove therein located intermediate said cam race end faces,
an integral roller clutch cage having a plurality of partially annular journal blocks separated by a plurality of pockets, said cage being sized so as to fit between said races in an installed position where said journal blocks and said cam race bearing surfaces are circumferentially aligned, said pockets further being sized to pass freely axially over said cam ramps when said journal blocks are circumferentially misaligned in one direction from said cam race bearing surfaces by an index facto, at least one of said journal blocks also having a circumferentially extending locking rib with a length slightly less than said index factor and sized to fit within said installation groove when said cage is in its installed position, and,
a roller and energizing spring pair located in each cage pocket,
whereby, said cage may be installed by sliding it axially over said cam race while circumferentially misaligned relative to said cam race by said index factor until said locking rib and installation groove are axially aligned, after which said cage may be turned in the opposite direction by said index factor, thereby moving said rib into said installation groove to axially retain said cage to said cam race with said cam race end faces unobstructed by said cage, after which said pathway race may be installed to complete said assembly.

2. An overrunning roller clutch assembly comprising,
a generally annular pathway race having a pair of axially opposed end faces and a cylindrical pathway,
a generally annular cam race having a pair of axially opposed end faces disposed generally coplanar to said pathway race end faces, said cam race also having a surface disposed generally coaxial to said pathway and comprised of a circumferentially spaced plurality of and cam ramps separated by a plurality of partially cylindrical bearing surfaces, at least one of said bearing surfaces also having a circumferentially extending installation groove therein located intermediate said cam race end faces,
an integral roller clutch cage having a plurality of partially annular journal blocks separated by a plurality of pockets, said cage being sized so as to fit between said races in an installed position where said journal blocks are disposed axially inboard of said race end faces and circumferentially aligned with said cam race bearing surfaces, said pockets further being sized to pass freely axially over said cam ramps when said journal blocks are circumferentially misaligned in one direction from said cam race bearing surfaces by an index factor, at least one of said journal blocks also having a circumferentially extending locking rib with a length slightly less than said index factor and sized to fit within said installation groove when said cage is in its installed position, and,
a roller and energizing spring pair located in each cage pocket,
whereby, said cage may be installed by sliding it axially over said cam race while circumferentially misaligned relative to said cam race by said index factor until said rib and installation groove are axially aligned, after which said cage may be turned in the opposite direction by said index factor, thereby moving said locking rib into said installation groove to axially retain said cage to said cam race with said cam race end faces unobstructed by said cage, after which said pathway race may be installed to complete said clutch assembly and to axially shield said cage with said coplanar race end faces.

3. An overrunning roller clutch assembly comprising,
a generally annular pathway race having a pair of axially opposed end faces and a cylindrical pathway,
a generally annular cam race having a pair of axially opposed end faces disposed generally coplanar to said pathway race end faces, said cam race also having a surface disposed generally coaxial to said pathway and comprised of a circumferentially spaced plurality of pairs of cam hooks and cam ramps separated by a plurality of partially cylindrical bearing surfaces, at least one of said bearing surfaces also having a circumferentially extending installation groove therein located intermediate said cam race end faces and opening to said cam hook,
an integral roller clutch cage having a plurality of partially annular journal blocks separated by a plurality of pockets, said cage being sized so as to fit between said races in an installed position where said journal blocks are disposed axially inboard of said race end faces and circumferentially aligned with said cam race bearing surfaces, said pockets further being sized to pass freely axially over said cam ramps when journal blocks are circumferentially misaligned in one direction from said cam race bearing surfaces by an index factor, at least one pocket also including a reaction face abutted with a respective cam hook in said installed position, at least one of said journal blocks also having a locking rib extending circumferentially from said reaction face with a length slightly less than said index factor and sized to fit within said installation groove when said cage is in its installed position, and, a roller and energizing spring pair located in each cage pocket, whereby, said cage may be installed by sliding it axially over said cam race while circumferentially misaligned relative to said cam race by said index factor until said rib and installation groove are axially aligned, after which said cage may be turned in the opposite direction by said index factor, thereby moving said reaction face into abutment with said cam hook and simultaneously moving said locking rib into said installation groove to axially retain said cage to said cam race with said cam race end faces unobstructed by said cage, after which said pathway race may be installed to complete said clutch assembly and to axially shield said cage with said coplanar race end faces.

* * * * *